United States Patent
Chou et al.

(10) Patent No.: US 8,164,047 B2
(45) Date of Patent: Apr. 24, 2012

(54) ILLUMINANCE DEVICE HAVING AN OPENING AT A REAR PART OF A GAS DISCHARGE LAMP AND EXPOSES THE BURNER AND PROJECTION SYSTEM

(75) Inventors: Chih-Cheng Chou, Hsinchu (TW); Shang-Hsuang Wu, Hsinchu (TW); Kai-Lun Hou, Hsinchu (TW)

(73) Assignee: Young Green Energy Co., Hsinchu County (TW)

( * ) Notice: Subject to any disclaimer, the term of this patent is extended or adjusted under 35 U.S.C. 154(b) by 406 days.

(21) Appl. No.: 12/619,691

(22) Filed: Nov. 17, 2009

(65) Prior Publication Data
US 2010/0271600 A1    Oct. 28, 2010

(30) Foreign Application Priority Data
Apr. 24, 2009   (TW) ................................ 98113694 A

(51) Int. Cl.
*H01J 5/02*   (2006.01)
(52) U.S. Cl. ........................................ 250/239; 353/61
(58) Field of Classification Search .................. 250/238, 250/239, 208.1; 353/57–61, 119, 52; 362/294, 362/345, 373
See application file for complete search history.

(56) References Cited

U.S. PATENT DOCUMENTS

| 6,558,004 | B2 | 5/2003 | Ito et al. |
| 6,976,760 | B2 | 12/2005 | Ito et al. |
| 7,367,679 | B2 * | 5/2008 | Emery ........................... 353/60 |

FOREIGN PATENT DOCUMENTS

| TW | I235281 | 7/2005 |
| TW | M278917 | 10/2005 |
| TW | I261858 | 9/2006 |
| TW | 200725158 | 7/2007 |
| TW | 200732821 | 9/2007 |

* cited by examiner

*Primary Examiner* — Que T Le
(74) *Attorney, Agent, or Firm* — Jianq Chyun IP Office

(57) ABSTRACT

An illuminance device including a gas discharge lamp, an airflow generator, and a distributing duct is provided. The lamp has a reflector, a base connected to the reflector, a burner installed in the reflector, and the base, a first opening located at the reflector and a front part of the lamp, and a second opening located at a rear part of the lamp and exposing the burner. The distributing duct has an inlet, a first outlet, and a second outlet, and an opening area of the first outlet is larger than that of the second outlet. A cooling airflow provided by the airflow generator enters the distributing duct via the inlet, the distributing duct guides a part of the cooling airflow to the first opening via the first outlet, and the distributing duct guides another part of the cooling airflow to the second opening via the second outlet.

20 Claims, 4 Drawing Sheets

ILLUMINANCE DEVICE HAVING AN OPENING AT A REAR PART OF A GAS DISCHARGE LAMP AND EXPOSES THE BURNER AND PROJECTION SYSTEM

CROSS-REFERENCE TO RELATED APPLICATION

This application claims the priority benefit of Taiwan application serial no. 98113694, filed Apr. 24, 2009. The entirety of the above-mentioned patent application is hereby incorporated by reference herein and made a part of specification.

BACKGROUND OF THE INVENTION

1. Field of the Invention

The invention relates to an illuminance device. More particularly, the invention relates to an illuminance device adapted to a projection system.

2. Description of Related Art

An ultra high pressure mercury lamp is generally used as a light source of a present projector, and the ultra high pressure mercury lamp is one kind of a gas discharge lamp. Since an operation temperature of the ultra high pressure mercury lamp is very high, during operation, the ultra high pressure mercury lamp has to be cooled down to avoid burning damage.

During a cooling process of the ultra high pressure mercury lamp, a bulb of a burner of the ultra high pressure mercury lamp has to be maintained to a specific high temperature range, while the temperature of other parts (for example, welding points among elements) of the burner cannot be too high. If these temperature requirements cannot be satisfied, a lifespan of the ultra high pressure mercury lamp is decreased.

References related to the light source cooling include Taiwan patent No. I235281 and I261858, and U.S. Pat. No. 6,976,760. Other references related to the light source cooling include Taiwan patent application publication No. 200725158 and 200732821, Taiwan patent No. M278917 and U.S. Pat. No. 6,558,004.

SUMMARY OF THE INVENTION

The invention is directed to an illuminance device having a good self-cooling effect.

The invention is directed to a projection system having an illuminance device, and the illuminance device has a good self-cooling effect.

Additional aspects and advantages of the invention will be set forth in the description of the techniques disclosed in the invention.

An embodiment of the invention provides an illuminance device including a gas discharge lamp, an airflow generator, and a distributing duct. The gas discharge lamp has a reflector, a base connected to the reflector, a burner installed in the reflector, and the base, a first opening located at the reflector and a front part of the gas discharge lamp, and a second opening located at a rear part of the gas discharge lamp and exposing the burner. The airflow generator is capable of providing a cooling airflow. The distributing duct has an inlet, a first outlet, and a second outlet, wherein an opening area of the first outlet is larger than an opening area of the second outlet. The cooling airflow provided by the airflow generator is capable of entering the distributing duct via the inlet, the distributing duct is capable of guiding a part of the cooling airflow to the first opening for entering the reflector via the first outlet, and the distributing duct is capable of guiding another part of the cooling airflow to the second opening via the second outlet for cooling the burner.

The embodiment of the invention provides a projection system using the aforementioned illuminance device as a light source.

The embodiment or the embodiments of the invention may have the at least one of the following advantages. In the embodiment of the invention, extra cooling airflow is provided to the opening located at the rear part of the gas discharge lamp and exposing the burner. Namely, a bulb of the gas discharge lamp and the rear part of the gas discharge lamp are simultaneously cooled down by the cooling airflow provided by the airflow generator, so as to decrease the temperatures of the bulb and the burner installed in the base, and maintain the temperature of any part of the burner within a normal operation range, such that the utilization lifespan of the gas discharge lamp may be prolonged.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing,"

"faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
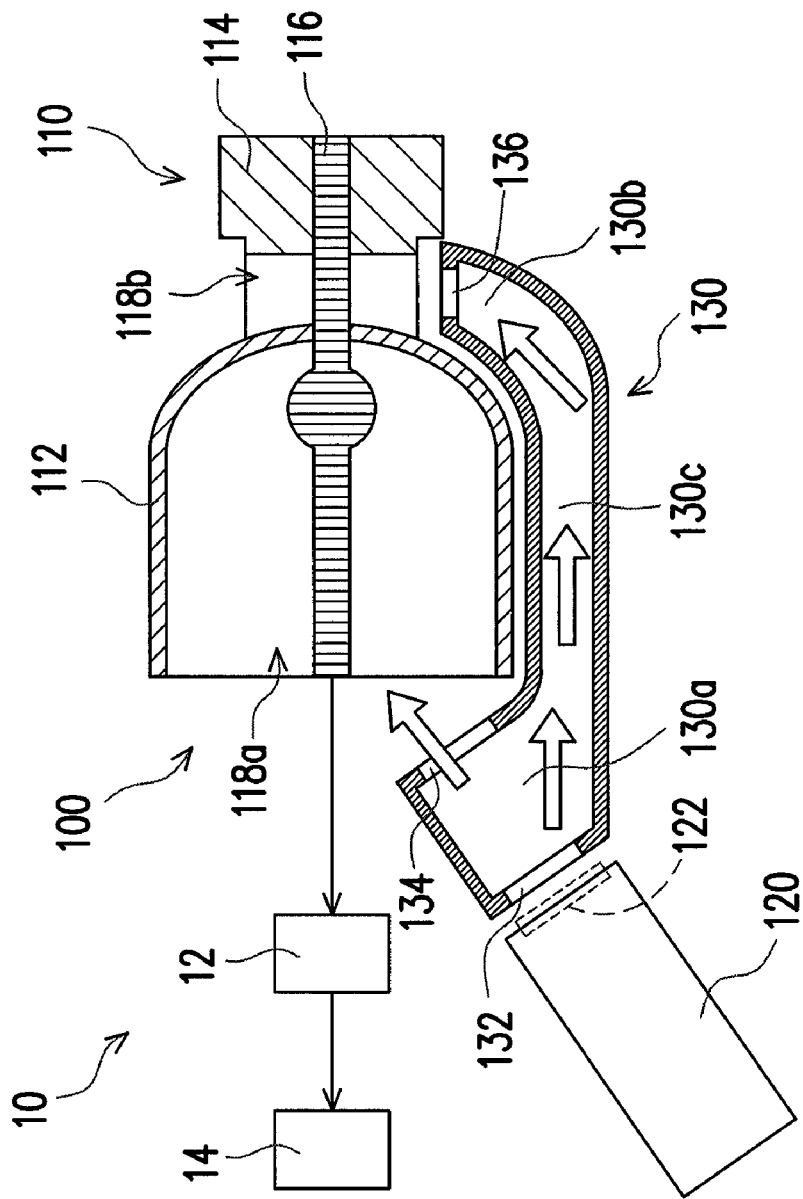
FIG. 1 is a cross-section view of a projection system according to an embodiment of the invention.

FIG. 1 is a cross-section view of a projection system according to an embodiment of the invention. Referring to FIG. 1, the projection system 10 includes an illuminance device 100, a light valve 12, and a lens 14. The illuminance device 100 is capable of providing a light beam, and the light valve 12 is disposed in a transmission path of the light beam and suitable for converting the light beam into an image beam. The lens 14 is disposed in the transmission path of the image beam and capable of projecting the image beam to external of the projection system 10 to form an image.

The illuminance device 100 includes a gas discharge lamp 110, a first airflow generator 120, and a distributing duct 130. The gas discharge lamp 110 has a reflector 112, a base 114 connected to the reflector 112, a burner 116 installed in the reflector 112, and the base 114, a first opening 118a located at the reflector 112 and a front part of the gas discharge lamp 110, and a second opening 118b located at a rear part of the gas discharge lamp 110 and exposing the burner 116. In the embodiment, the gas discharge lamp 110 may be an ultra high pressure mercury lamp, the second opening 118b is located at the base 114, and the light beam is transmitted to the light valve 12 through the first opening 118a.

The first airflow generator 120 provides a cooling airflow. The distributing duct 130 has an inlet 132, a first outlet 134, and a second outlet 136, wherein an opening area of the first outlet 134 is larger than an opening area of the second outlet 136. The cooling airflow provided by the first airflow generator 120 enters the distributing duct 130 via the inlet 132. The distributing duct 130 guides a part of the cooling airflow to the first opening 118a via the first outlet 134, so that the part of the cooling airflow may enter the reflector 112 to cool down the burner 116, and the distributing duct 130 guides another part of the cooling airflow to the second opening 118b via the second outlet 136 for cooling the burner 116.

The distributing duct 130 extends from the front part of the gas discharge lamp 110 to the rear part of the gas discharge lamp 110. The first outlet 134 is located adjacent and facing to the first opening 118a, the second outlet 136 is located adjacent and facing to the second opening 118b, and an outlet 122 of the first airflow generator 120 is located adjacent and facing to the inlet 132. By such means, the utilization efficiency of the cooling airflow is improved. In the embodiment, the distributing duct 130 may extend along a profile of the reflector 112, which avails shielding stray light and saves a space.

The distributing duct 130 has a front part 130a, a rear part 130b, and a middle part 130c connected to the front part 130a and the rear part 130b. The inlet 132 and the first outlet 134 are located at the front part 130a of the distributing duct 130. The second outlet 136 is located at the rear part 130b of the distributing duct 130.

In the embodiment, the inlet 132 is located facing to the first outlet 134, and the inlet 132 may avail guiding most of the cooling airflow to the first outlet 134 having the relatively great opening area. Moreover, one or a plurality of splitter plates (not shown) may be disposed at the first outlet 134 of the distributing duct 130 for distributing the airflow output from the first outlet 134 to the first opening 118a.

In the embodiment, a distance between the second outlet 136 and the second opening 118b may be less than 12.5 millimeters, so as to ensure a good cooling effect.

In the embodiment, the first airflow generator 120 may be a centrifugal fan.

Figure 2:
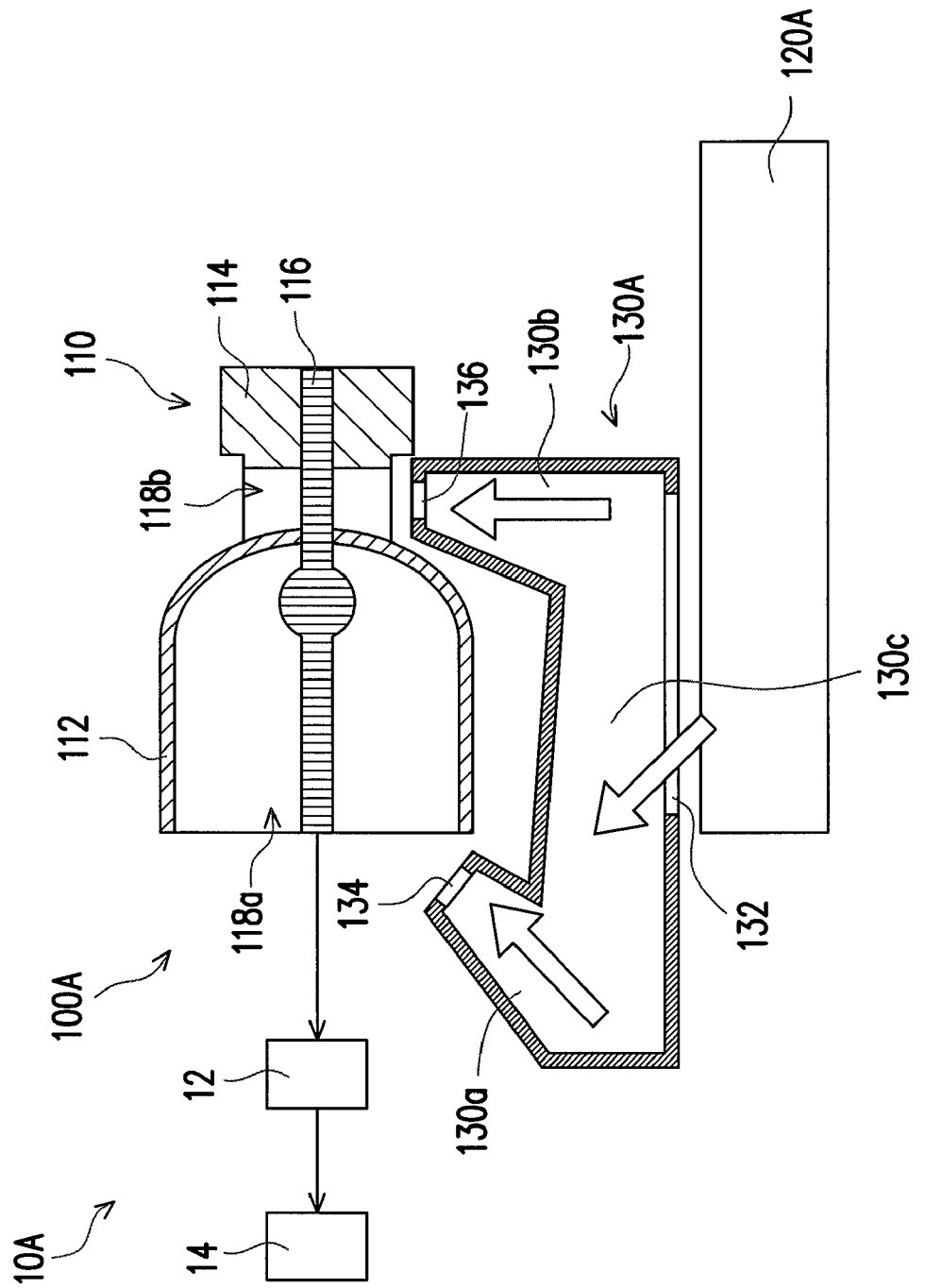
FIG. 2 is a cross-section view of a projection system according to another embodiment of the invention.

However, different to the embodiment of FIG. 1 that the first airflow generator 120 is the centrifugal fan, in another embodiment of FIG. 2, the first airflow generator 120A of the illuminance device 100A of the projection system 10A may also be an axial fan. Moreover, the inlet 132 may further be located at the middle part 130c of the distributing duct 130A. The first outlet 134 is located at the front part 130a of the distributing duct 130A, and the second outlet 136 is located at the rear part 130b of the distributing duct 130A.

Figure 3:
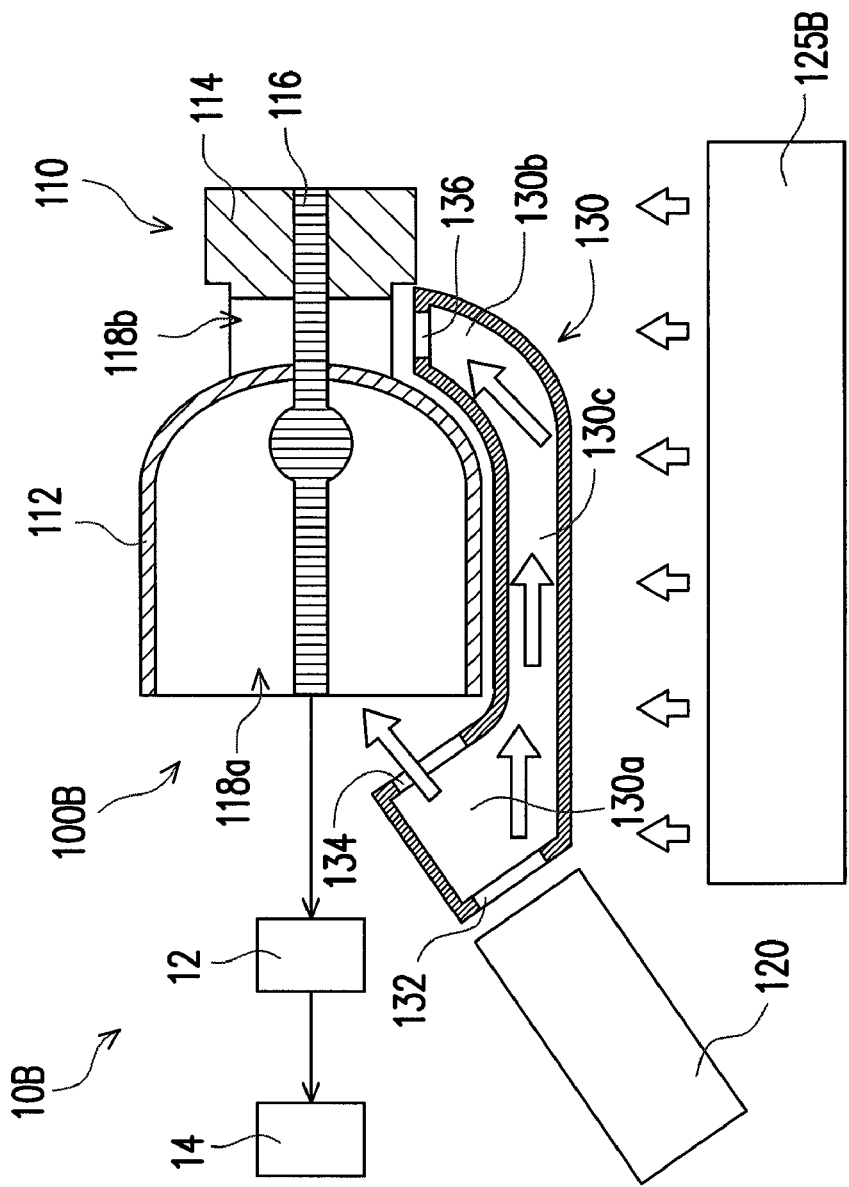
FIG. 3 is a cross-section view of a projection system according to another embodiment of the invention.

FIG. 3 is a cross-section view of a projection system according to another embodiment of the invention. Referring to FIG. 3, the projection system 10B of the embodiment is similar to the projection system 10 of FIG. 1, and a difference there between is that the illuminance device 100B of the projection system 10B of FIG. 3 further includes another airflow generator 125B. The airflow generator 125B is used for providing the cooling airflow to external of the reflector 112 and external of the base 114. Moreover, the first airflow generator 120 and the second airflow generator 125B are located at the same side of the gas discharge lamp 110.

Figure 4:
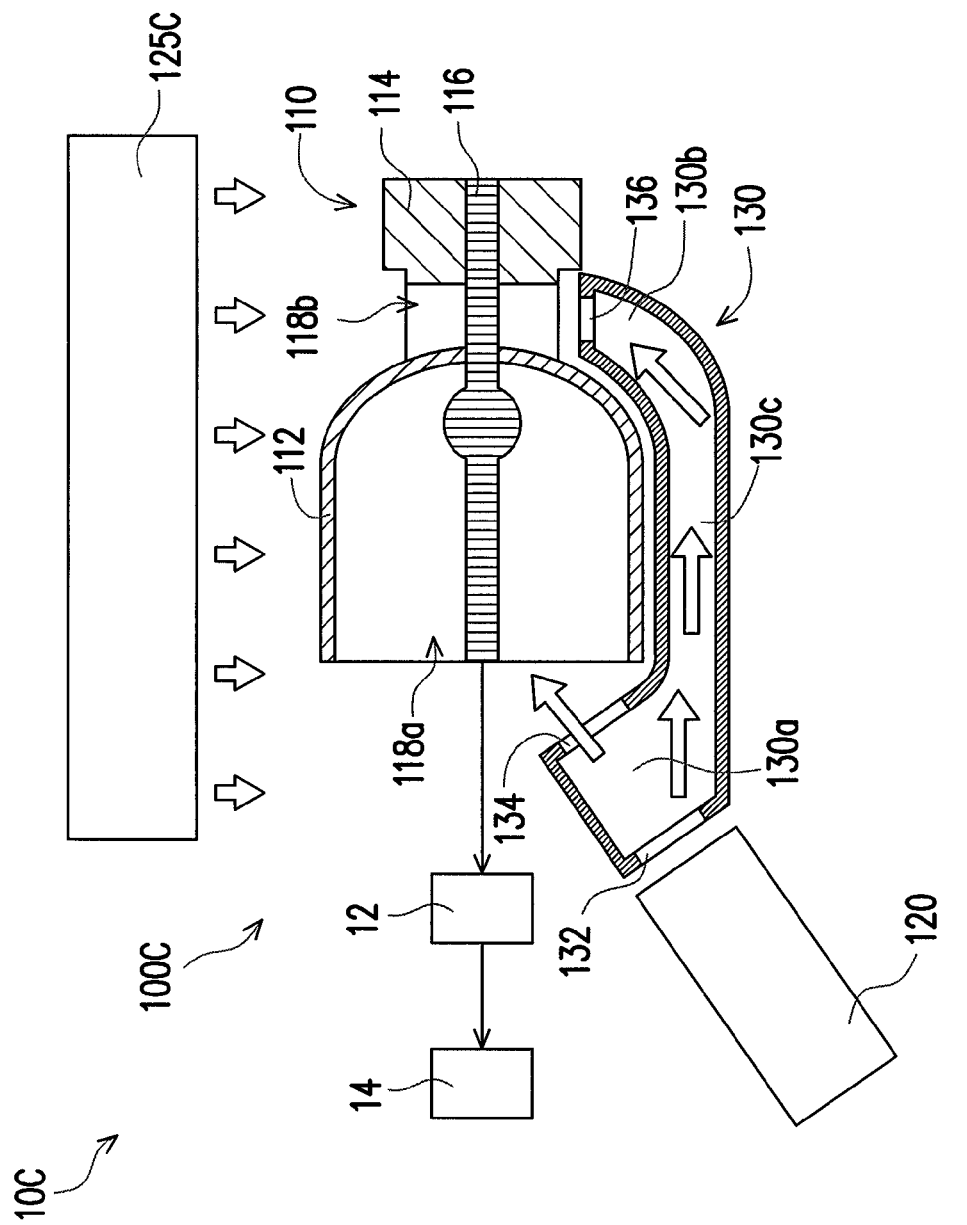
FIG. 4 is a cross-section view of a projection system according to another embodiment of the invention.

FIG. 4 is a cross-section view of a projection system according to another embodiment of the invention. Referring to FIG. 4, the projection system 10C of the embodiment is similar to the projection system 10B of FIG. 3, and a difference there between is that in the illuminance device 100C of the projection system 10C of FIG. 4, the first airflow generator 120 and the second airflow generator 125C are respectively located at two sides of the gas discharge lamp 110.

In summary, the embodiment or the embodiments of the invention may have the at least one of the following advantages. According to the above embodiments of the invention, extra cooling airflow is provided to the opening located at the rear part of the gas discharge lamp and exposing the burner. Namely, a bulb of the gas discharge lamp and the rear part of the gas discharge lamp are simultaneously cooled down by the cooling airflow provided by the airflow generator, so as to decrease the temperatures of the bulb and the burner installed in the base, and maintain the temperature of any part of the burner within a normal operation range, such that the utilization lifespan of the gas discharge lamp may be prolonged.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illuminance device, comprising:
    a gas discharge lamp having a reflector, a base connected to the reflector, a burner installed in the reflector and the base, a first opening, and a second opening, wherein the first opening is located at the reflector and a front part of the gas discharge lamp, and the second opening is located at a rear part of the gas discharge lamp and exposes the burner;
    a first airflow generator capable of providing a cooling airflow; and
    a distributing duct having an inlet, a first outlet, and a second outlet, wherein an opening area of the first outlet is larger than an opening area of the second outlet, the cooling airflow provided by the first airflow generator is capable of entering the distributing duct via the inlet, the distributing duct is capable of guiding a part of the cooling airflow to the first opening for entering the reflector via the first outlet, and the distributing duct is capable of guiding another part of the cooling airflow to the second opening via the second outlet for cooling the burner.

2. The illuminance device as claimed in claim 1, wherein the second opening is located at the base.

3. The illuminance device as claimed in claim 1, wherein the distributing duct extends from the front part of the gas discharge lamp to the rear part of the gas discharge lamp, the first outlet is located facing to the first opening, and the second outlet is located facing to the second opening.

4. The illuminance device as claimed in claim 3, wherein the distributing duct extends along a profile of the reflector.

5. The illuminance device as claimed in claim 3, wherein the inlet is located facing to the first outlet.

6. The illuminance device as claimed in claim 3, wherein the inlet is located at a middle part of the distributing duct.

7. The illuminance device as claimed in claim 1, wherein a distance between the second outlet and the second opening is less than 12.5 millimeters.

8. The illuminance device as claimed in claim 1, wherein the first airflow generator is a centrifugal fan.

9. The illuminance device as claimed in claim 1, wherein the first airflow generator is an axial fan.

10. The illuminance device as claimed in claim 1, further comprising:
    a second airflow generator capable of providing another cooling airflow flowing to external of the reflector and external of the base.

11. A projection system, comprising:
    an illuminance device capable of providing a light beam, the illuminance device comprising:
        a gas discharge lamp having a reflector, a base connected to the reflector, a burner installed in the reflector and the base, a first opening, and a second opening, wherein the first opening is located at the reflector and a front part of the gas discharge lamp, and the second opening is located at a rear part of the gas discharge lamp and exposes the burner;
        a first airflow generator capable of providing a cooling airflow; and
        a distributing duct having an inlet, a first outlet, and a second outlet, wherein an opening area of the first outlet is larger than an opening area of the second outlet, the cooling airflow provided by the first airflow generator is capable of entering the distributing duct via the inlet, the distributing duct is capable of guiding a part of the cooling airflow to the first opening for entering the reflector via the first outlet, and the distributing duct is capable of guiding another part of the cooling airflow to the second opening via the second outlet for cooling the burner;
    a light valve capable of converting the light beam passing through the first opening into an image beam; and
    a lens disposed in a transmission path of the image beam, and capable of projecting the image beam to external of the projection system to form an image.

12. The projection system as claimed in claim 11, wherein the second opening is located at the base.

13. The projection system as claimed in claim 11, wherein the distributing duct extends from the front part of the gas discharge lamp to the rear part of the gas discharge lamp, the first outlet is located facing to the first opening, and the second outlet is located facing to the second opening.

14. The projection system as claimed in claim 13, wherein the distributing duct extends along a profile of the reflector.

15. The projection system as claimed in claim 13, wherein the inlet is located facing to the first outlet.

16. The projection system as claimed in claim 13, wherein the inlet is located at a middle part of the distributing duct.

17. The projection system as claimed in claim 11, wherein a distance between the second outlet and the second opening is less than 12.5 millimeters.

18. The projection system as claimed in claim 11, wherein the first airflow generator is a centrifugal fan.

19. The projection system as claimed in claim 11, wherein the first airflow generator is an axial fan.

20. The projection system as claimed in claim 11, wherein the illuminance device further comprises:
    a second airflow generator capable of providing another cooling airflow flowing to external of the reflector and external of the base.

* * * * *